Aug. 19, 1958 D. MITCHELL 2,848,545

RADIANT ENERGY SIGNALING SYSTEM

Filed Sept. 27, 1955 7 Sheets-Sheet 1

INVENTOR
D. MITCHELL
BY B. F. Stoddard
ATTORNEY

INVENTOR
D. MITCHELL
BY [signature]
ATTORNEY

Aug. 19, 1958 D. MITCHELL 2,848,545

RADIANT ENERGY SIGNALING SYSTEM

Filed Sept. 27, 1955 7 Sheets-Sheet 3

INVENTOR
D. MITCHELL
BY B. H. Stoddard
ATTORNEY

RADIANT ENERGY SIGNALING SYSTEM

INVENTOR
D. MITCHELL
BY B. H. Stoddard
ATTORNEY

RADIANT ENERGY SIGNALING SYSTEM

Filed Sept. 27, 1955 7 Sheets-Sheet 5

INVENTOR
D. MITCHELL
BY B. H. Stoddard
ATTORNEY

RADIANT ENERGY SIGNALING SYSTEM

Filed Sept. 27, 1955 7 Sheets-Sheet 6

INVENTOR
D. MITCHELL
BY [signature]
ATTORNEY

Aug. 19, 1958 D. MITCHELL 2,848,545

RADIANT ENERGY SIGNALING SYSTEM

Filed Sept. 27, 1955 7 Sheets-Sheet 7

INVENTOR
D. MITCHELL
BY B. H. Stoddard
ATTORNEY

United States Patent Office 2,848,545
Patented Aug. 19, 1958

2,848,545

RADIANT ENERGY SIGNALING SYSTEM

Doren Mitchell, Martinsville, N. J., assignor to Bell Telephone Laboratories, Incorporated, New York, N. Y., a corporation of New York Application September 27, 1955, Serial No. 536,897
7 Claims. (Cl. 179—15)

This invention relates to radio telephone communication systems and, more particularly, to multichannel point-to-point radio telephone networks for accommodating light traffic over thinly settled large areas.

An object of this invention is to provide a radio telephone communication system with improved means for serving a large number of customers thinly distributed over a large area.

Another object of the invention is to provide a point-to-point radio telephone communication system with improved means for utilizing a small number of radiant energy signaling channels for establishing a wide variety of signaling paths of different lengths over a large area.

An additional object of the invention is to provide a point-to-point radio telephone communication system with improved means for routing calls from one station to another and for providing the stations with supervisory signals.

These and other objects of the invention are accomplished by means which include dividing the section of the frequency spectrum that is allotted for use by the system into a lower portion and an upper portion with each portion containing the same number of radio signaling channels. Similarly, the radio telephone signaling stations included in the system are divided into two substantially equal groups. Each station in the first group is designed to transmit carrier waves over one or more of the radio channels in the lower portion of the allotted band of frequencies and to receive carrier signals sent over corresponding radio channels in the upper portion of the band. Each station in the second group is conversely designed to transmit carrier energy over one or more of the channels in the upper portion of the same allotted band and to receive carrier waves sent over corresponding channels in the lower portion of the band.

As all of the radio receivers used in this system are of a conventional type, most of their selectivity is in their intermediate frequency stages because their radio frequency filters are not sufficiently narrow to eliminate or exclude all interference. For this reason, the frequency-allocation plan set forth above is of considerable assistance in helping the radio receivers to discriminate against unwanted high-power radio frequency energy and, consequently, aids materially in reducing interference due to cross-modulation in the receivers.

Since this frequency-allocation plan prevents a station in one group from communicating directly with another station in the same group due to the fact that the radio receivers at the stations in any one group are not tuned to any of the radio channels assigned to their associated radio transmitters, the stations are located in such a manner that each station that is assigned to one group is located adjacent to one or more stations that are assigned to the other group.

In accordance with the point-to-point plan of operation of this system, each station is assigned one of a group of allotted audio frequency calling tones for identification purposes when calls are being made. The same calling tone may be assigned to more than one station provided that it is not assigned to two adjacent stations belonging to the same group. In addition, the transmitting channels of the two groups are paired so that a call made over a transmitting channel assigned to the stations in one group is answered over a corresponding transmitting channel assigned to the stations in the other group as is explained more fully hereinafter.

In routing a point-to-point call through the network of stations, the station originating the call transmits, over an idle channel in the frequency section allotted to its group for transmission, carrier waves modulated with the calling tone assigned to an adjacent station in the other group. The second station answers the call by using the corresponding return radio frequency thus establishing a two-way communication path. This second station then transmits, over an idle radio channel in the frequency section allotted to its group for transmission, carrier energy modulated with the calling tone assigned to a further adjacent station in the first group. The third station then sends an answering signal to the second station over the corresponding return carrier frequency thereby completing the second link of this two-way call. This third station next transmits, over an idle channel in the first group of transmitting channels, carrier waves modulated with the calling tone assigned to a still more distant adjacent station in the second group. This step-by-step process is continued until the desired station is reached. The message is then relayed from one point to another point over this network of called stations. Various circuit structures are included in the equipment at each station for providing busy indications and for performing various supervisory functions.

These and other features of the invention are explained more fully in connection with the following detailed description of the drawing, in which.

Figure 4:
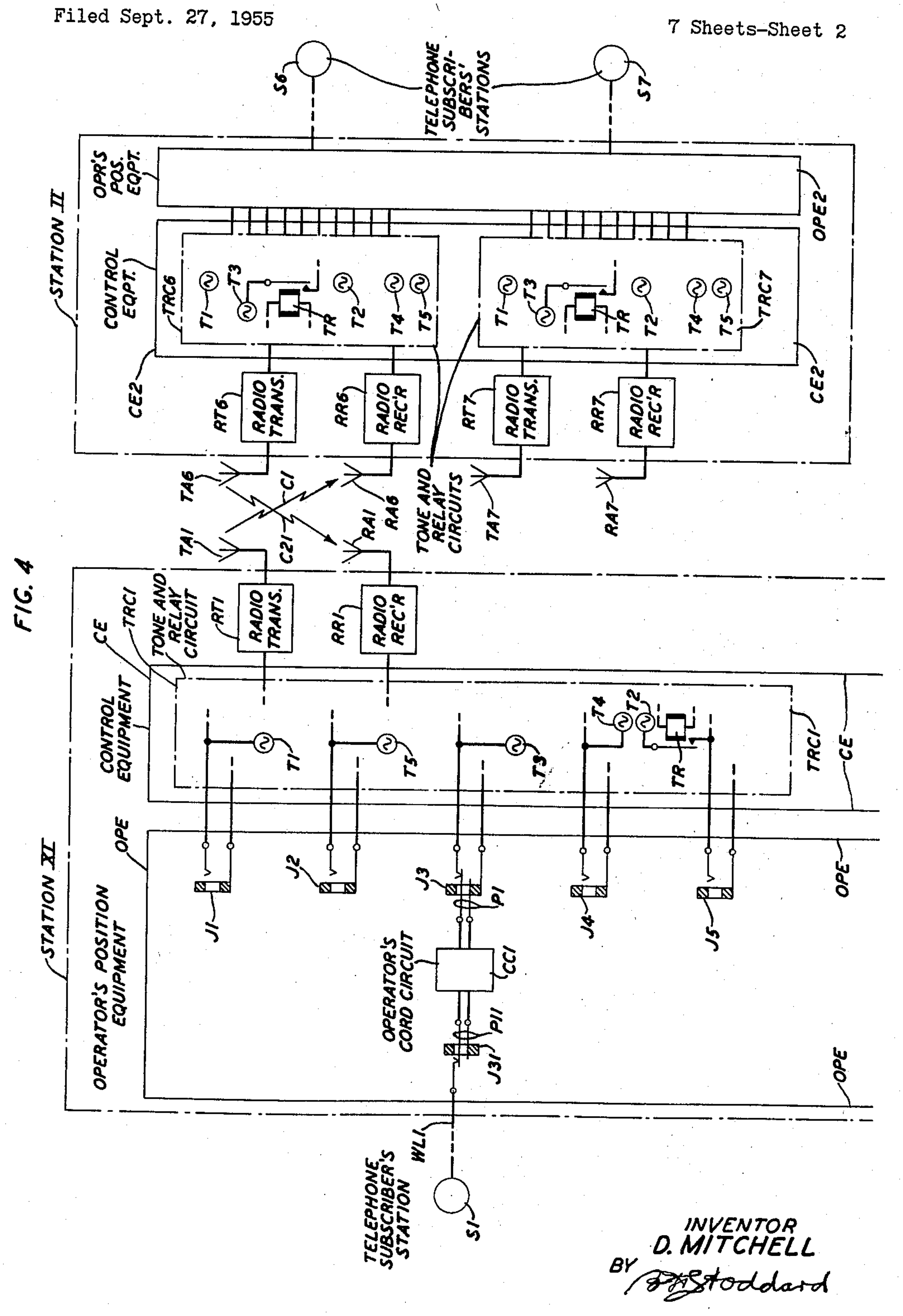
Figure 5:
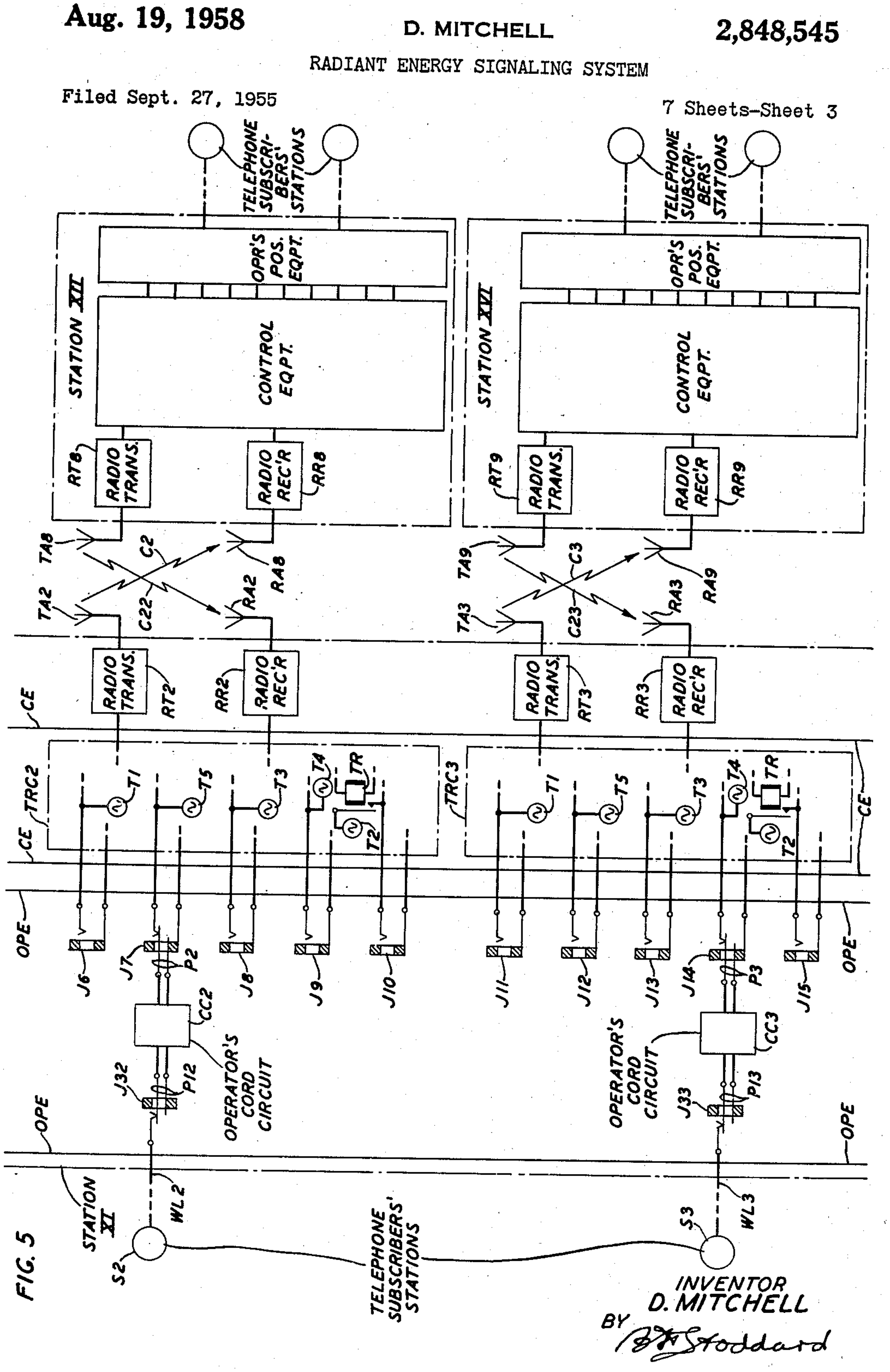
Figures 6, 10, 11:
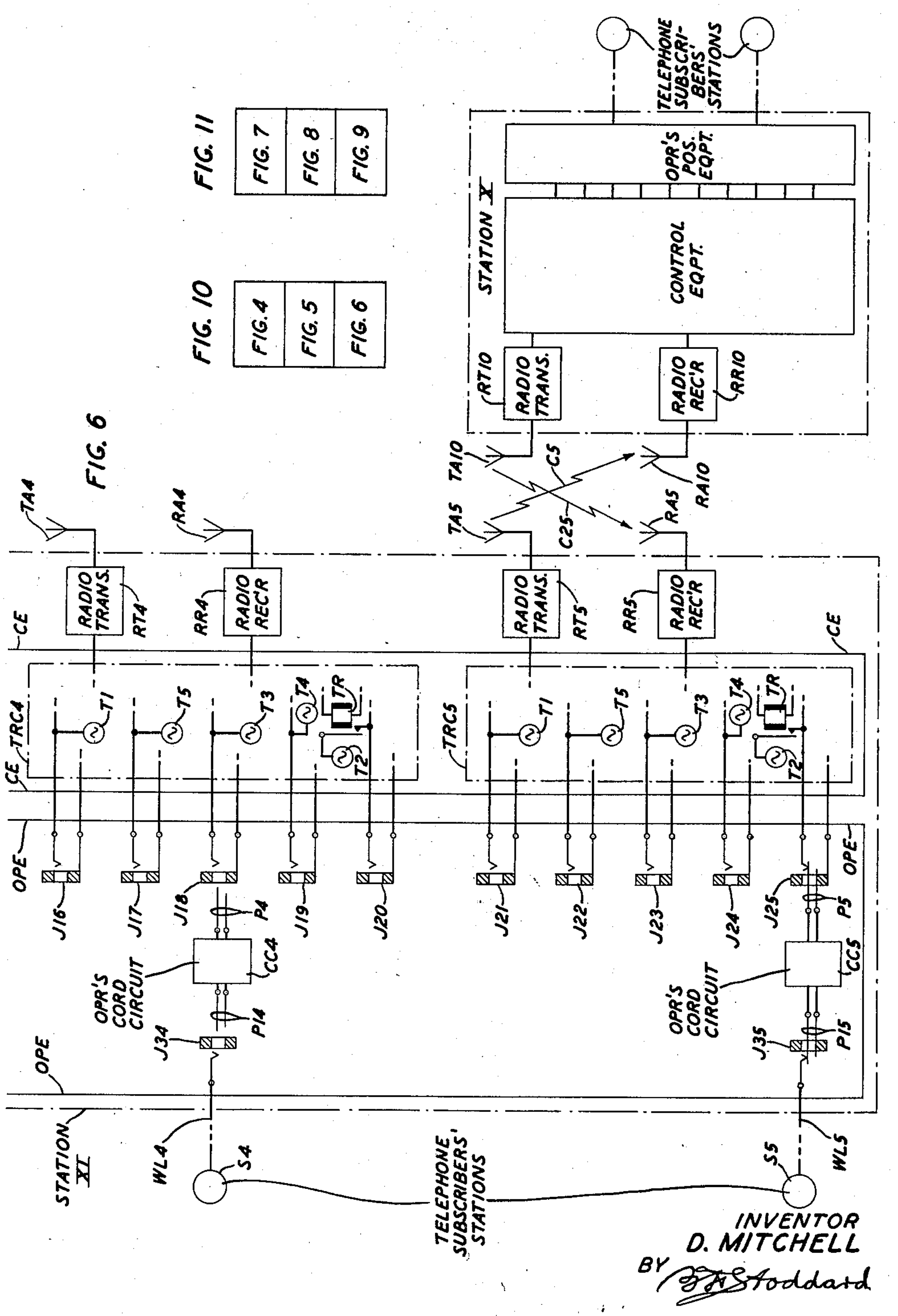
Figure 7:
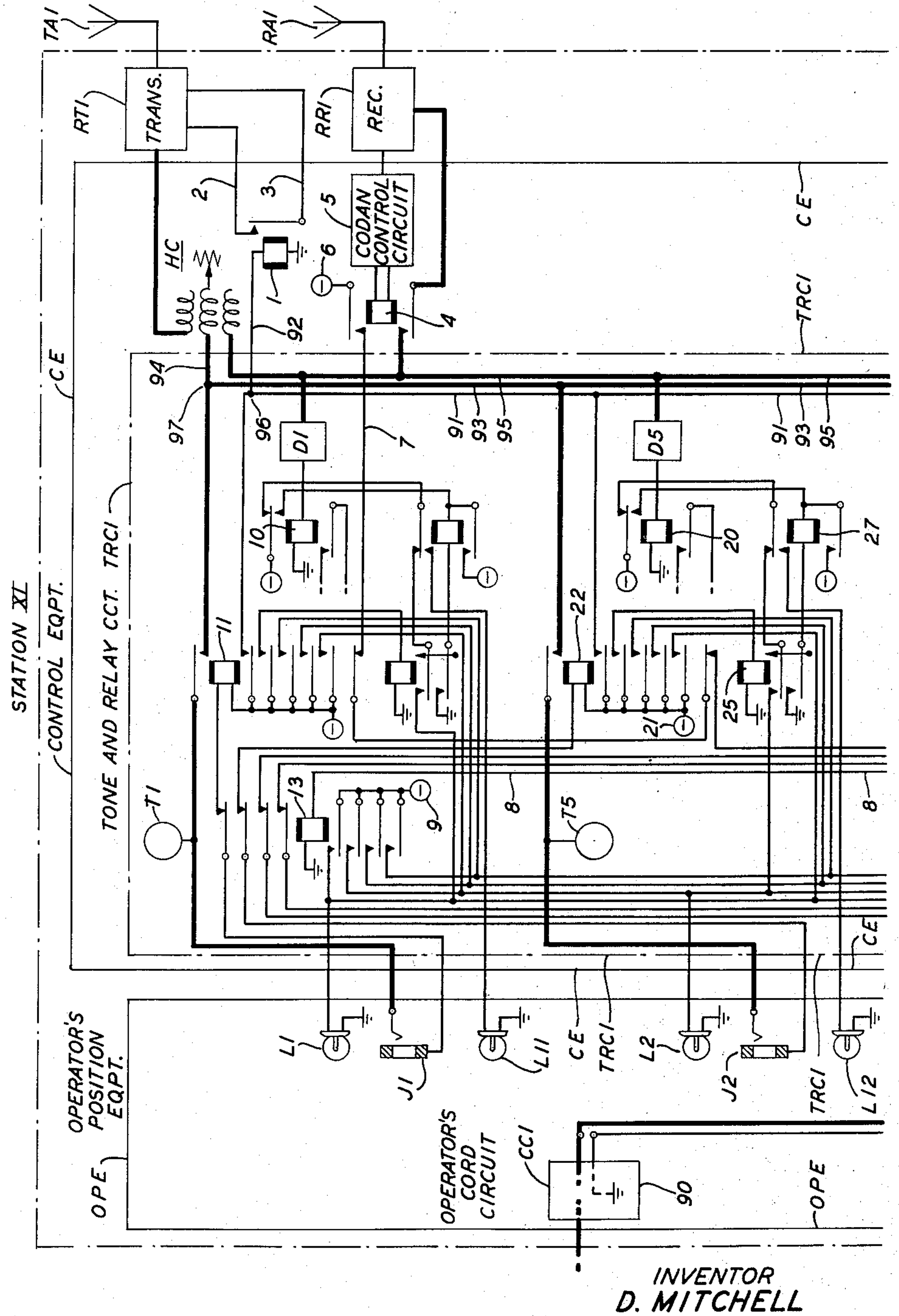
Figure 8:
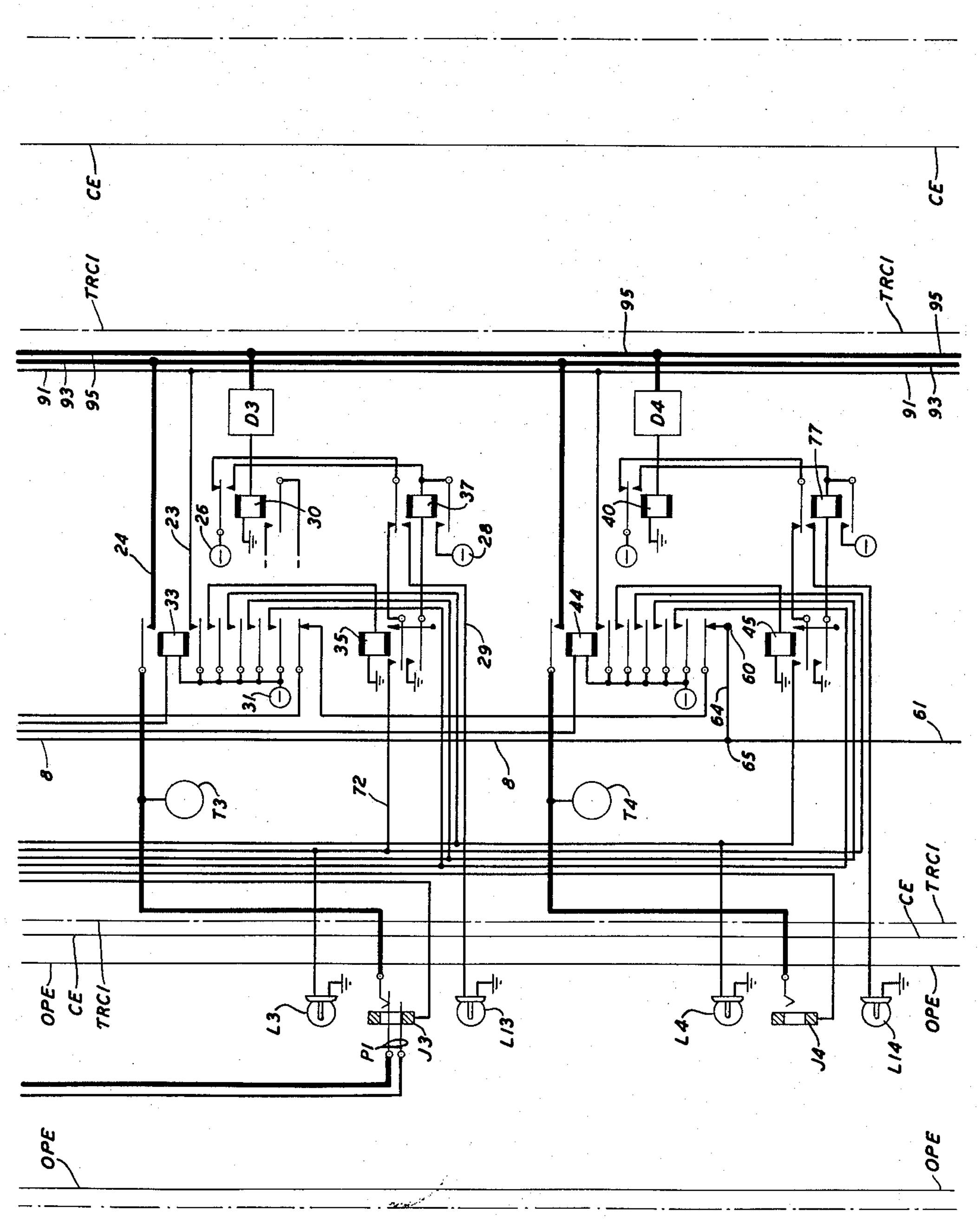
Figure 9:
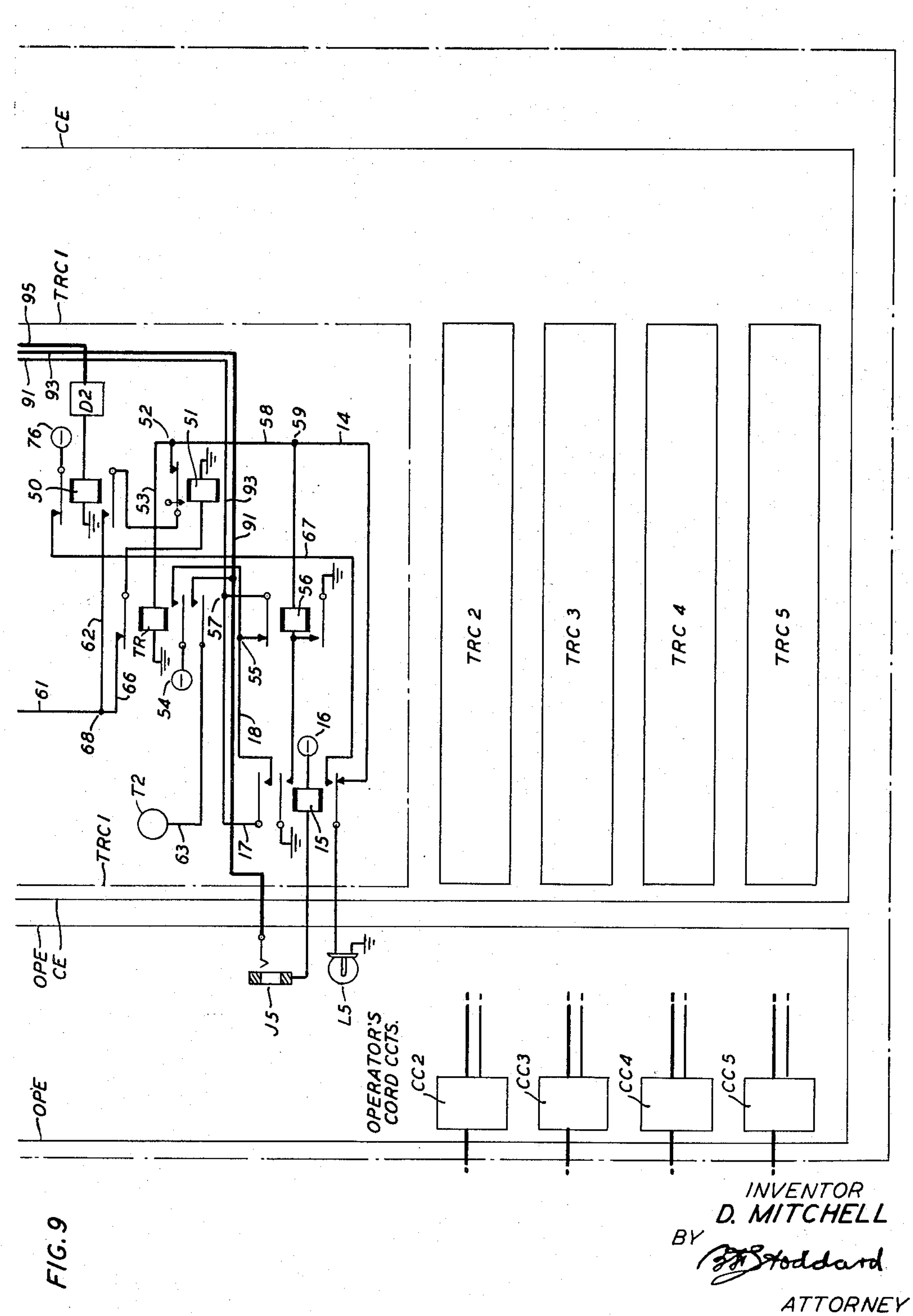

Figs. 4, 5, and 6 are block diagrams which, when taken together, illustrate the overall plan of operation of the system and the method used in assigning the audio frequency calling tones and the radio frequency signaling channels to individual stations in the two groups;

Figs. 7, 8, and 9 are circuit diagrams which, when taken together, illustrate the components of a representative station within the system and, in particular, the circuit structure of one of the tone and relay circuits at this station;

Fig. 10 is a block diagram indicating the order in which Figs. 4, 5, and 6 are to be read; and Fig. 11 is a block diagram showing the order in which Figs. 7, 8, and 9 are to be read.

Figures 1, 2, 3:
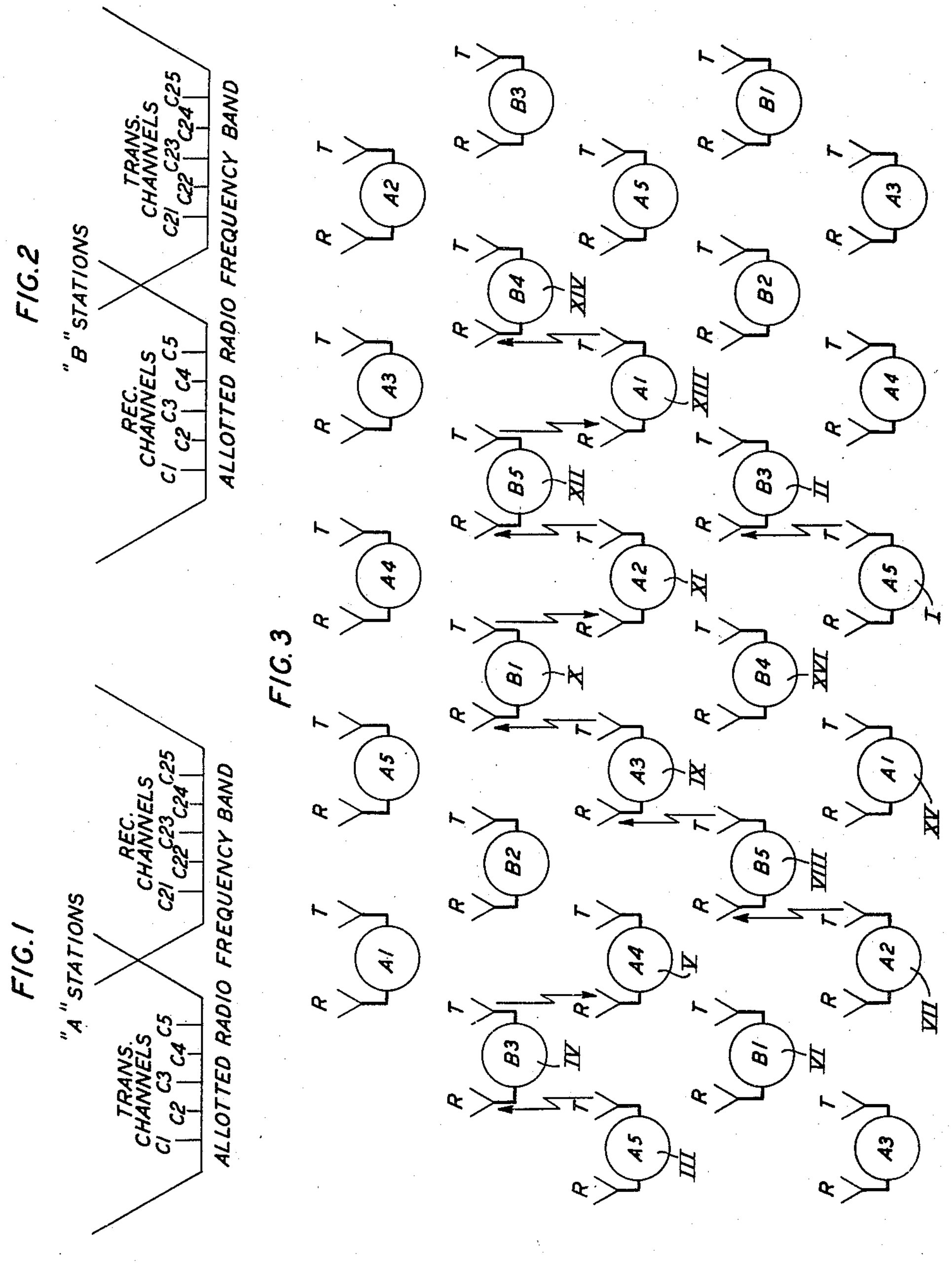
Fig. 1 is a diagram illustrating the manner in which a band of frequencies allotted to the system is divided into an equal number of transmitting channels and receiving channels for use by one group of stations.
Fig. 2 is a diagram showing how the carrier channels in the allotted frequency band are oppositely assigned for use by the other group of stations.
Fig. 3 is a schematic representation of a geographical distribution of the stations belonging to the two groups and also indicates the routes followed between stations of different groups in establishing typical calls.

As is shown in Figs. 1 and 2, the radio frequency band that is allotted for use by the system is divided into two portions each containing the same number of carrier signaling channels. Thus, the lower portion contains carrier channels C1 to C5, inclusive, and the upper portion contains carrier channels C21 to C25, inclusive. Although only five transmitting channels and five receiving channels have been indicated in both Fig. 1 and Fig. 2, it is to be understood that this has been done for the purpose of simplicity and that actually there may be a much larger number of channels in each portion of the band. These two frequency sections are separated by a third portion of the allotted frequency band, as is indicated in Figs. 1 and 2, which is not used for signaling purposes but instead functions as a guard band. This guard band provides further assistance in reducing the possibility of interference caused by cross-modulation in the radio receivers.

It was stated above that the radio telephone signaling stations in this system are divided into two substantially equal groups. For convenience in describing the operation of this system, these groups of stations will be referred to hereinafter as group A and group B. As is indicated in Fig. 1, the radio frequency channels C1 to C5, inclusive, in the lower portion of the frequency band that is allotted for use by this system are assigned for use by the radio transmitters at the stations in group A, and the channels C21 to C25, inclusive, in the upper portion of the allotted band are assigned for use by the radio receivers at the stations in group A. Conversely, as is indicated in Fig. 2, all of the stations in group B have their transmitting equipments tuned to transmit signals over one or more of the carrier channels C21 to C25, inclusive, in the upper portion of the same allotted radio frequency band, and have their receiving equipments tuned to receive signals sent over corresponding carrier channels C1 to C5, inclusive, in the lower portion of the band.

In other words, the same group of radio frequency channels that is assigned for purposes of signal transmission from the stations in group A is also assigned for reception by the stations in group B and, similarly, the group of channels that is assigned for reception by the stations in group A is also assigned for transmission from the stations in group B. Furthermore, as was mentioned above, it is necessary to pair the group A transmitting channels C1 to C5, inclusive, with the group B transmitting channels C21 to C25, inclusive, so that a call made over a transmitting channel in group A will be answered over a corresponding transmitting channel in group B. For example, a call made by an A station over channel C3 would be answered by a B station over channel C23.

Accordingly, with this frequency assignment plan in operation, it is impossible for a station in group A to communicate directly with another A station because none of the radio receivers at the A stations are tuned to any of the channels that are used by the radio transmitters at the A stations. Obviously, a similar situation exists with respect to the B stations. Thus, it is necessary for a call from a station in one group to be routed to a station in the other group.

The method of routing calls in this system employs an allotted group of audio frequency tones for station identification purposes with each station being assigned one of these calling tones. The same calling tone may be assigned to more than one station provided that it is not assigned to two adjacent stations. This requirement can be met by using only five calling tones which are assigned to the stations in accordance with the pattern shown in Fig. 3. These tones are selected to be outside the voice band so as not to interfere with the telephone signals.

In Fig. 3, the circles represent the signaling stations and the reference characters "T" and "R" indicate the transmitting and receiving antennas with which each station is equipped. The reference characters "A" and "B" designate the group to which a particular station belongs. The Arabic numerals "1," "2," "3," "4," and "5" signify which one of the five available calling tones is assigned to a particular station. The Roman numerals that are applied to certain of the stations are for assistance in describing the tracing of the routes followed in establishing certain typical calls between stations of different groups as is described hereinafter.

The simplest type of call is a call from a station in one group directly to an adjacent station in the other group. Such a call is represented in Fig. 3 as being in progress between station I belonging to group A and station II belonging to group B. Since station I is a member of group A, it transmits the third calling tone, which is assigned to station II, over one of the radio carriers C1 to C5, inclusive, that is idle, such as channel C1. Station II sends an answering signal which, for convenience, may be its own identification tone over the corresponding paired return carrier frequency, which in this example is channel C21, and a two-way communication path is thus established.

The next higher order of call is from a station in one group to an adjacent station in the same group. Since a station in one group cannot receive directly from another station in the same group, this call must be routed through a station in the other group. This type of call is indicated in Fig. 3 as extending from station III through station IV to station V. In this example, station III transmits the third calling tone, which is assigned to station IV, over an idle one of the carriers C1 to C5, inclusive, such as channel C2. Station IV sends back an answering signal constituted by its identification tone over the corresponding paired return carrier frequency, which in this instance is channel C22, thereby completing the first link of this two-way call. Upon being informed of the identity of the station desired by the operator at station III, the operator at station IV then transmits the fourth calling tone, which is assigned to station V, over an idle one of the carriers C21 to C25, inclusive, such as channel C23. Station V answers by sending its identification tone back over the return carrier frequency, which in this example is channel C3, thus completing the second link of this two-way communication path between these three stations.

It is to be noted that calls can be routed through the network of stations in any convenient manner and that it is not necessary for them to be cleared through any central station. Taking the above-described call as an example, if, at the time of initiating the call, station IV should already be operating over all of its assigned carrier channels, then the call could have been routed through station VI by modulating the carrier transmitted from station III with the first calling tone which is assigned to station VI.

It can be understood that the number of alternate routes that are available increases with the distance between the calling station and the called station. For example, a call from station VII to station XIV is shown in Fig. 3 as progressing from station VII upward through stations VIII and IX to station X, down to station XI, up to station XII, down to station XIII, and then up to station XIV. When a call extends over this distance and passes through as many station points as this call does, there would be a considerable number of alternate routes available if any of the initially selected stations should be busy.

As an example of this flexibility that is available in routing calls in this system, it can be understood that if, at the time this last call was made, station IX should already be operating over all of its assigned carrier channels, then station VIII could have forwarded the call to either station V or to station XV. This is an important advantage from the traffic standpoint because it enables calls to be routed quickly through an appreciable number of stations without any substantial delays due to some of the way stations being busy.

From the above description of the method used in routing calls, it can be understood that the radiant energy channels allotted to this system are employed in much the same manner as trunk circuits for establishing a number of communication paths between the signaling stations so that calls can be established from any one station to any of the other stations. This is more fully explained hereinafter in connection with the subsequent detailed description of Figs. 4, 5, and 6 which are to be read in the order indicated in Fig. 10 and which illustrate the overall plan of operation of the system and the method followed in using the five audio frequency calling tones and the different radio frequency signaling channels to initiate calls between individual stations in the two groups of stations.

The left portions of Figs. 4, 5, and 6 when taken together show schematically the various components of one of the stations, such as the station XI of Fig. 3, which may be considered as being typical of all the other stations in this system. Some of these other stations are represented schematically in lesser detail in the right portions of Figs. 4, 5, and 6. All of the stations in this system are telephone central offices but, for purposes of simplicity, they are referred to herein simply as "stations."

Accordingly, station XI comprises the usual telephone central office operator's position equipment OPE which includes several conventional cord circuits CC1 to CC5, inclusive, each connected to a respectively different one of a plurality of plugs P1 to P5, inclusive, which are adapted to be inserted into a number of trunk line jacks J1 to J25, inclusive. Each of the operator's cord circuits CC1 to CC5, inclusive, is also connected to a respectively different one of another plurality of plugs P11 to P15, inclusive, which are adapted to be inserted into a number of telephone subscribers' line jacks J31 to J35, inclusive. These line jacks J31 to J35, inclusive, are each connected by wire lines WL1 to WL5, inclusive, to conventional telephone subscribers' stations S1 to S5, inclusive. Although all the telephone transmission circuits, such as the wire lines and leads extending from the tips of the various plugs and jacks, are shown in the drawing as single lines, it is to be understood that this has been done for purposes of simplicity and that all the circuits carrying telephone currents are actually conventional two-wire circuits well known to those skilled in the art.

The station XI further comprises control equipment CE which includes a plurality of tone and relay circuits TRC1 to TRC5, inclusive, for coupling the trunk line jacks J1 to J25, inclusive, to a plurality of radio transmitters RT1 to RT5, inclusive, and also to a plurality of radio receivers RR1 to RR5, inclusive. The output from each of the radio transmitters RT1 to RT5, inclusive, is supplied to a respectively different one of a plurality of transmitting antennas TA1 to TA5, inclusive. Similarly, the input to each of the radio receivers RR1 to RR5, inclusive, is coupled to a respectively different one of a plurality of receiving antennas RA1 to RA5, inclusive. Although the radio transmitters RT1 to RT5, inclusive, and the radio receivers RR1 to RR5, inclusive, are represented in the drawing as being located at the telephone central office XI, it is to be understood that, if desired, they may be placed in some other convenient location in which case they would be connected to the central office by conventional wire lines in a manner well known to those skilled in the art.

Since station XI is indicated in Fig. 3 as belonging to group A, all of its radio transmitters RT1 to RT5, inclusive, are designed to transmit carrier waves over respectively different channels in the lower portion of the allotted band, specifically channels C1 to C5, inclusive, of Fig. 1. Similarly, all of its radio receivers RR1 to RR5, inclusive, are tuned to receive carrier waves transmitted over respectively different channels in the upper portion of the allotted band, namely, channels C21 to C25, inclusive, of Fig. 1. This permits a number of different calls to be established simultaneously through this station.

As is shown in Figs. 4, 5, and 6 the trunk line jacks J1 to J25, inclusive, are arranged in groups of five with each group of five jacks being connected to a respectively different one of the tone and relay circuits TRC1 to TRC5, inclusive. It should be noted that, in each group of five jacks, the upper four jacks are used alternatively for outgoing calls, and the fifth jack in the bottom of each group is used only for incoming calls. Since one of the functions of the control equipment CE is to couple the trunk line jacks J1 to J25, inclusive, to the radio transmitters RT1 and RT5, inclusive, and to the radio receivers RR1 to RR5, inclusive, each of the tone and relay circuits TRC1 to TRC5, inclusive, is connected to a respectively different one of the radio transmitters RT1 to RT5, inclusive, and also to a respectively different one of the radio receivers RR1 to RR5, inclusive.

In view of this circuit construction it can be understood that, at any one time, there should not be more than one of the operator's plugs P1 to P5, inclusive, used with any one group of trunk line jacks due to the fact that the respectively associated tone and relay circuit has only one radio transmitter and one radio receiver coupled thereto.

Each of the tone and relay circuits TRC1 to TRC5, inclusive, includes five sources T1 to T5, inclusive, of different audio frequency tones. It should be noted that, although the five tones produced by the audio frequency tone generators T1 to T5, inclusive, are different from each other, the same five tones are used in each of the tone and relay circuits TRC1 to TRC5, inclusive, at this station and also in each of the tone and relay circuits at all of the other stations in this system. In each of the tone and relay circuits TRC1 to TRC5, inclusive, each of four of the tone sources T1 and T5, inclusive, is connected to a spring of a respectively different one of the four associated outgoing trunk line jacks. These outgoing jacks function like outgoing trunks in that, when a plug from an operator's cord circuit is inserted into one of the outgoing jacks, the associated calling tone is superimposed, as is explained in detail hereinafter, upon the outgoing carrier from the respectively associated radio transmitter. This is analogous to sending a selected calling tone out over a common trunk circuit extending from station XI to the four adjacent stations II, X, XII, and XVI shown in Fig. 3.

It was stated above that each station is assigned one of the five audio frequency tones as a station identification tone. Accordingly, in each tone and relay circuit, the particular tone generator assigned to any one station for identification purposes is connected to an armature of a tone relay TR having its contact connected to a spring of its respectively associated incoming trunk line jack. Since the station shown at the left in Figs. 4, 5, and 6 is assumed to be the station XI of Fig. 3 and is represented therein as being assigned the second calling tone, each of the five tone sources T2 in the control equipment CE shown in Figs. 4, 5, and 6 is connected to an armature of the tone relay TR in its respectively associated tone and relay circuit TRC1 to TRC5, inclusive.

As is explained hereinafter, each tone relay TR is individually energized in response to the reception by its respectively associated radio receiver RR1 to RR5, inclusive, of the calling tone assigned to this station. Energization of any one of the tone relays TR performs several functions described subsequently and including the connection of its respectively associated incoming trunk line jack to its associated identification tone generator T2. This enables the incoming jacks to function like the outputs of incoming trunk circuits from different stations because each of the radio receivers RR1 to RR5, inclusive, is tuned to receive signals transmitted over respectively different signaling channels.

The other stations in this system have components similar to those of station XI. For example, the right portion of Fig. 4 illustrates another typical station which may be considered as being the station II of Fig. 3. It is shown to include telephone central office operator's position equipment OPE2, control equipment CE2, radio transmitters RT6 and RT7, transmitting antennas TA6 and TA7, radio receivers RR6 and RR7, and receiving antennas RA6 and RA7. Although station II is represented as having only two radio transmitters and two radio receivers, it is to be understood that this has been done for the purpose of simplicity and that actually this station may have a much larger number of transmitters and receivers. For the same reason, only two telephone subscribers' stations S6 and S7 are shown to be connected to station II although there would actually be many more. Since station II is indicated in Fig. 3 as belonging to group B, its radio transmitters are designed to transmit carrier waves over certain of the channels C21 to C25, inclusive, in the upper portion of the allotted band shown in Fig. 2 while its radio receivers are tuned to certain of the channels C1 to C5, inclusive, in the lower portion of the frequency band shown in Fig. 2.

The control equipment CE2 at station II is illustrated as including two tone and relay circuits TRC6 and TRC7 although it is to be understood that the number would actually be the same as the number of pairs of radio transmitters and receivers. Each of these tone and relay circuits TRC6 and TRC7 has five audio frequency tone generators T1 to T5, inclusive, which, as was stated above, are the same five tones used at all of the other stations in this system. Since station II is represented in Fig. 3 as being assigned the third calling tone, the tone relay TR in each of these tone and relay circuits TRC6 and TRC7 has its armature connected to its respectively associated tone source T3.

When a call is to be routed from station XI to station II, one of the plugs from an operator's cord circuit at station XI is inserted into one of the outgoing trunk line jacks that is connected to one of the sources T3 of the third calling tone as this is the identification tone assigned to station II. In the example illustrated in Fig. 4, the plug P1 from the cord circuit CC1 is shown to be inserted into the jack J3 thereby impressing the third audio frequency calling tone from the source T3 in the tone and relay circuit TRC1 upon the carrier produced by the radio transmitter RT1.

This tone-modulated carrier is radiated from the antenna TA1 over one of the carrier channels C1 to C5, inclusive, in the lower portion of the allotted frequency band shown in Fig. 1, such as the radio carrier frequency C1, and is received by the antenna RA6 at station II. After the received energy is demodulated in the radio receiver RR6, it is applied to the tone and relay circuit TRC6 where it effects the energization of the associated tone relay TR in a manner that is explained in detail hereinafter.

Accordingly, this tone relay TR in the tone and relay circuit TRC6 operates its armature to perform several functions described subsequently and including the connection of its assigned identification tone source T3 to the radio transmitter RT6. Answering carrier modulated with the identification tone T3 is now radiated from the antenna TA6 over the corresponding paired return radio channel which, in this example, is the carrier frequency C21 in the upper portion of the allotted frequency band shown in Fig. 2. The receiving antenna RA1 at station XI receives this answering tone-modulated carrier and delivers it to the radio receiver RR1, thus establishing a two-way communication path. The demodulated answering tone is applied to the tone and relay circuit TRC1 for effecting various supervisory operations which are described in detail hereinafter.

Several other stations are shown schematically in the right portions of Figs. 5 and 6 and they are all represented as having the same components as station XI. Although, for the purpose of simplicity, only one radio transmitter and receiver are shown at each of these stations, it is to be understood that actually they may be provided with a number of radio transmitters and receivers as was explained above. The method of communicating with these stations is the same as that described above.

For example, to communicate with station XII, which is indicated in Fig. 3 as being assigned the fifth identification tone and as belonging to group B, one of the plugs from an operator's cord circuit at station XI would be inserted into one of the outgoing trunk line jacks that is connected to one of the sources T5 of the fifth calling tone. In the example illustrated in Fig. 5, the plug P2 from the cord circuit CC2 is shown to be inserted into the jack J7 thereby impressing the fifth audio frequency tone from the source T5 in the tone and relay circuit TRC2 upon the carrier produced by the radio transmitter RT2. This carrier is radiated from the antenna TA2 over one of the radio channels C1 to C5, inclusive, in the lower portion of the allotted frequency band shown in Fig. 1, such as the carrier frequency C2.

At station XII, the antenna RA8 receives the tone-modulated carrier which, after being demodulated in the radio receiver RR8, effects the energization of its associated tone relay. In turn, this causes the radio transmitter RT8 to send out answering carrier from its antenna TA8 over the paired answering channel which, in this instance, is channel C22 in the upper portion of the allotted frequency band shown in Fig. 2. Upon being received by the antenna RA2 at station XI, the answering carrier is supplied to the radio receiver RR2 thereby completing another two-way communication path.

As another example, Fig. 5 shows the operator's plug P3 at station XI to be inserted into the jack J14 for impressing the fourth calling tone from the source T4 in the tone and relay circuit TRC3 upon the carrier produced by the radio transmitter RT3. This carrier is radiated from the antenna TA3 over channel C3 to the receiving antenna RA9 at station XVI. In response to this call, answering carrier energy modulated with the fourth audio frequency tone is radiated from the antenna TA9 at station XVI over the paired answering channel C23. The reception of this tone-modulated carrier by the antenna RA3 at station XI establishes still another two-way communication path. From these examples, it can be understood that the operator's plugs function as selective means for selecting any one of the calling tone generators.

The lower portion of Fig. 6 illustrates a somewhat different situation in that, in this example, it is assumed that station X, which is indicated in Fig. 3 as belonging to group B, has initiated a call to station XI. In making this call, the carrier produced by the radio transmitter RT10 at station X is modulated with the calling tone assigned to station XI which, as was stated above, is the second tone. This tone-modulated carrier is radiated by the antenna TA10 over one of the radio channels C21 to C25, inclusive, in the upper portion of the allotted frequency band shown in Fig. 2, such as the radio frequency C25.

After being received by the receiving antenna RA5 at station XI, the received energy is demodulated in the radio receiver RR5 and is then applied to the tone and relay circuit TRC5 where it effects the energization of the associated tone relay TR. As is described in detail hereinafter, the operation of the armature of this tone relay TR causes the assigned answering tone from the source T2 to be impressed upon the carrier produced by the radio transmitter RT5. This answering carrier is radiated by the antenna TA5 over the corresponding paired return carrier frequency which, in this example, is the radio frequency C5 indicated in the lower portion of the allotted frequency band shown in Fig. 1. Reception of this answering carrier by the receiving antenna RA10 at station X completes this two-way communication path.

At the same time, the operation of the armature of the tone relay TR in the tone and relay circuit TRC5 at station XI effects the illumination of a supervisory lamp in the operator's position equipment OPE in a manner described in detail hereinafter. In response to the lighting of this lamp, the operator at station XI inserts one of the plugs P1 to P5, inclusive, into the incoming, or answering, jack associated with this lamp. In the example illustrated in Fig. 6, the plug P5 is shown to be inserted into thte jack J25 thereby connecting the cord circuit CC5 to this two-way radiant energy signaling path extending to station X.

From these examples, it can be understood that the radiant energy signaling channels in this system function like trunk lines due to the above-described features of dividing the stations into two groups, dividing the allotted frequency band into two portions, employing five identification tones, and pairing the answering channels with the calling channels. Thus, an operator at any one of the stations can establish various two-way communication paths throughout the system by simply inserting the plugs from the cord circuits into the appropriate trunk line jacks in substantially the same manner as for automatic trunk operation in a conventional telephone system.

In other words, each pair of radio frequency channels serves as a common medium for a two-way trunk circuit extending in any one of four different directions. However, as far as the operator is concerned, her duties are substantially the same as they would be if she were using any other type of trunk circuit. For example, the operator at station XI can route a call over the paired radio frequency channels C1—C21 to any one of the four stations II, X, XII, or XVI by simply inserting one of her cord circuit plugs P1 to P5, inclusive, into the appropriate one of the outgoing trunk line jacks J1, to J4, inclusive. If the channels C1—C21 should be busy, the call could be routed over any one of the other paired trunk channels to any one of the four stations II, X, XII, or XVI by merely plugging in to the appropriate one of the outgoing jacks J6 to J9 associated with the paired trunk channels C2—C22, by using one of outgoing jacks J11 to J14 for the paired channels C3—C23, by selecting one of the jacks J16 to J19 for the paired channels C4—C24, or by choosing one of the jacks J21 to J24 for the paired channels C5—C25. It can therefore be understood that this method of operation could, if desired, be employed at an automatic switching office.

Figs. 7, 8, and 9 are to be read in the order indicated in Fig. 11 and illustrate in detail the components of one of the tone and relay circuits which may be considered as being typical of all the others employed in the system. For descriptive purposes, this tone and relay circuit is assumed to be the tone and relay circuit TRC1 in the control equipment CE at station XI which is shown schematically in Figs. 4, 5, and 6. In addition, Figs. 7, 8, and 9 include a number of other elements which, for purposes of simplicity, are not indicated in the schematic representation of the operator's position equipment OPE and the control equipment CE shown in Figs. 4, 5, and 6.

In Fig. 7, the control equipment CE at station XI is shown to include a conventional start relay 1 for controlling the starting and stopping of the radio transmitter RT1. It should be noted that the radio transmitter RT1 is normally not in an operating condition due to its conventional power control circuit, which extends along conductors 2 and 3, being open at the armature and contact of the start relay 1 which is normally not energized. When the start relay 1 becomes energized by means described hereinafter, it causes its armature to move into engagement with its associated contact thereby closing the power control circuit 2—3 of the radio transmitter RT1 and starting its operation in a manner well known to those skilled in the art. The resulting carrier waves produced by the radio transmitter RT1 are then radiated by the transmitting antenna TA1.

The control equipment CE also includes a codan relay 4 having its energizing winding connected to a conventional codan control circuit 5 which is coupled to an output of the radio receiver RR1. The codan control circuit 5 may be of any suitable type known to those skilled in the art and is designed to cause the codan relay 4 to become unenergized when the quality of the carrier energy received by the radio receiver RR1 is unsatisfactory for communication purposes and to become energized when the quality of the received carrier energy is good. It should be noted that, unlike the radio transmitter RT1 which is normally not in an operating condition, the radio receiver RR1 is normally in an operating condition. The codan relay 4 is provided with two armatures, one of which is connected to a battery 6 and the other to another output of the radio receiver RR1.

In Figs. 7 and 8, each of four of the tone generators T1, T3, T4 and T5 in the tone and relay circuit TRC1 is shown to be connected to a spring of a respectively different one of four outgoing trunk line jacks J1 to J4, inclusive, in the operator's position equipment OPE. The sleeve of each of the outgoing jacks J1 to J4, inclusive, is connected to a respectively different one of a plurality of upper armatures of a relay 13 in the tone and relay circuit TRC1. Associated with each of the outgoing jacks J1 to J4, inclusive, is a respectively different one of a plurality of busy lamps L1 to L4, inclusive, and also a respectively different one of a plurality of supervisory lamps L11 to L14, inclusive. Each of the busy lamps L1 to L4, inclusive, is connected to a respectively different one of a plurality of lower armature contacts of the relay 13. Each of the supervisory lamps L11 to L14, inclusive, is connected to respectively different other relay contacts in the tone and relay circuit TRC1 as is described hereinafter.

Since it is assumed above that station XI is assigned the second identification tone, Fig. 9 shows that the second tone generator T2 in the tone and relay circuit TRC1 is connected to an armature of its associated tone relay TR. The relay contact associated with this armature is coupled to a spring of the incoming trunk line jack J5 in the operator's position equipment OPE. The sleeve of the incoming jack J5 is coupled to the winding of a relay 15 in the tone and relay circuit TRC1. Associated with the incoming jack J5 is a line lamp L5 which has its energizing circuit controlled by an armature of the relay 15.

In order to detect the above-mentioned station identification tones when they are received at station XI, output energy from the radio receiver RR1, for example, is supplied over the lower armature of the codan relay 4 to five tone detectors D1 to D5, inclusive, which are each designed to detect only a respectively different one of the five audio frequency identification tones that are used in this system. The output from each of the tone detectors D1 to D5, inclusive, is applied to the winding of a respectively different one of a plurality of associated relays 10, 20, 30, 40, and 50 for effecting their energization individually. The tone and relay circuit TRC1 also includes a plurality of other relays for performing functions which are described hereinafter.

For purposes of simplicity, the other tone and relay circuits TRC2 to TRC5, inclusive, at station XI are indicated in Fig. 9 merely by rectangles as it is to be understood that their components are similar to those of the tone and relay circuit TRC1 and that they are correspondingly connected to similar lamps and jacks associated with the cord circuits CC2, CC3, CC4, and CC5 in the operator's position equipment OPE. It is also to be understood that they are connected in a like manner to their associated radio transmitters RT2 to RT5, inclusive, and radio receivers RR2 to RR5, inclusive, which are shown in Figs. 5 and 6.

The operation of the system will now be described in detail with particular reference to the station equipment shown in Figs. 7, 8, and 9. One of the functions of the station equipment is to indicate whether a particular channel is idle or busy. For example, if a station other than the station XI is making a call over channel C1, the called station will transmit answering carrier waves over channel C21. This answering carrier will be received at the calling station and also at all other stations within the transmitting-receiving area of the called station.

If station XI is in this area, its radio receiver RR1 will receive the answering carrier C21 and this will cause the codan control circuit 5 to effect the energization of the codan relay 4 which accordingly will operate its armatures. The operation of the upper armature of the codan relay 4 closes a path for current from the battery 6 to flow along a lead 7, over the bottom released armature of a relay 11 associated with the tone source T1, over the bottom released armatures in series of similar relays 22, 33, and 44 associated respectively with the tone sources T5, T3, and T4, over to a junction point 60, along a lead 64 to a junction point 65, up along a lead 8, and then through the winding of relay 13 to ground.

This causes relay 13 to operate its armatures with the result that its lower armatures will now apply current from a battery 9 to all of the busy lamps L1 to L4, inclusive. The resulting illumination of the busy lamps L1 to L4, inclusive, serves to inform the operator at station XI that the paired channels C1—C21 are busy and that a cord circuit plug should not be inserted into any one of the outgoing trunk line jacks J1 to J4, inclusive, at this time.

As a safety precaution, a related function of the station equipment is to positively prevent a call from being initated over a channel that is busy with a call made from another station. This is accomplished by connecting the sleeve of each of the outgoing trunk line jacks J1 to J4, inclusive, to a respectively different one of the upper armature of relay 13. It should be noted that these upper armatures are normally in engagement with their associated contacts which are each connected to the winding of a respectively different one of the relays 11, 22, 33, and 44 which control the energization of the start relay 1.

Accordingly, when the operation of the upper armature of the codan relay 4 effects the energization of relay 13 in the manner described above, the upper armatures of relay 13 will move out of engagement with their associated contacts thereby opening the energizing circuits of the relays 11, 22, 33, and 44 by disconnecting their windings from the sleeves of the jacks J1 to J4, inclusive. This prevents the starting of the radio transmitter RT1 in the event that the operator at station XI should inadvertently insert a cord circuit plug into one of the outgoing jacks J1 to J4, inclusive, while channel C1 is busy.

Thus it can be understood that the energization of the codan relay 4 at this time in effect disables the outgoing jacks J1 to J4, inclusive, because the circuits extending from their springs are now held open at the upper armatures of relays 11, 22, 33, and 44 which cannot now be energized due to the circuits extending from the sleeves of the jacks J1 to J4, inclusive, being held open at the upper armatures of relay 13.

The manner in which the station equipment functions will now be explained with reference to the call mentioned above in the description of Fig. 4 as extending from the operator's cord circuit CC1 at station XI over channel C1 to station II. If the busy lamps L1 to L4, inclusive, are not illuminated, thus indicating that the paired channels C1—C21 are idle, then the operator at station XI inserts the cord circuit plug P1 into the appropriate outgoing trunk line jack. Since station II is assigned the third calling tone and since jack J3 is connected to the third tone source T3, the proper trunk line jack in this example is the jack J3.

Accordingly, when the plug P1 is inserted in the jack J3, a path will be closed from ground 90 in the operator's cord circuit CC1, over the sleeve of the plug P1 to the sleeve of the jack J3, over the third uppermost released armature of relay 13, and then through the winding of relay 33 to a battery 31. This causes relay 33 to operate its armatures with the result that its innermost lower armature will now apply current from the battery 31 over leads 23, 91, and 92 to the winding of the start relay 1 thereby effecting the starting of the radio transmitter RT1. The operation of the top armature of relay 33 couples the spring of the jack J3 and the tone source T3 to leads 24, 93, and 94, and then through the hybrid coil HC to the radio transmitter RT1. Accordingly, carrier waves modulated with the third calling tone will now be radiated continuously from the transmitting antenna TA1 over channel C1 for the duration of the call.

At the same time, the operation of the bottom armature of relay 33 opens the circuit described above for energizing relay 13. This is desirable because otherwise the subsequent energization of the codan relay 4 in response to the reception of answering carrier waves would effect the energization of relay 13 which, in turn would illuminate all the busy lamps L1 to L4, inclusive.

It was stated above that there should not be more than one of the operator's plugs P1 to P5, inclusive, used with any one group of trunk line jacks due to the fact that the respectively associated tone and relay circuit has only one radio transmitter and one radio receiver coupled thereto. Accordingly, in order to remind the operator at this station that the radio circuits associated with the tone and relay circuit TRC1 are now busy, the operation of the three lower armatures of relay 33 next to the bottom armature thereof applies current from battery 31 to effect the illumination of the busy lamps L1, L2, and L4 associated respectively with the other outgoing jacks J1, J2, and J4 in this group.

In preparation for a subsequently described sequence of operations, the operation of the second innermost lower armature of relay 33 connects the battery 31 to the winding of a relay 35 which is of the slow-to-operate type.

Before the expiration of the delay period of relay 35, the called station II will, if idle, respond to the call by transmitting carrier waves of the frequency C21. These carrier waves will be modulated, in a manner described hereinafter, with the third audio frequency tone which is the answering identification tone assigned to station II.

This tone-moduated answering carrier will be received by the radio receiver RR1 at station XI. If the quality of the receiver carrier is satisfactory for communication purposes, it will cause the codan control circuit 5 to effect the energization of the codan relay 4 with the resulting operation of its armatures. The operation of the upper armature of the codan relay 4 is ineffectual at this time due to the operation of the bottom lower armature of relay 33 as was explained above.

The operation of the lower armature of the codan relay 4 will connect an output of the radio receiver RR1 to a lead 95 extending to the hybrid coil HC and also to the inputs of the tone detectors D1 to D5, inclusive. As was stated above, each of the tone detectors D1 to D5, inclusive, is designed to detect only a respectively different one of the five identification tones. Accordingly, the detector D3 will now be the only one to respond to this particular received answering tone and it will apply the detected energy to the winding of the relay 30 to effect the operation of its armatures.

The operation of the upper armature of relay 30 connects a battery 26 to one side of the winding of a relay 37 having its other side connected to the outer bottom armature of the slow-to-operate relay 35. Therefore, when relay 35 operates its armatures at the expiration of its delay period, its outer bottom armature will complete a path for energizing relay 37 which will now operate its armatures. The operation of the lower armature of relay 37 closes a locking circuit for itself by connecting a battery 28 over the operated outer bottom armature of relay 35 to ground. Relay 37 will thus remain locked in an energized condition until the operator removes the plug P1 from the jack J3 thereby effecting the deenergization of relay 33 which, in turn, effects the deenergization of relay 35 with the resultant opening of the locking circuit of relay 37.

In order to prepare a circuit for providing a supervisory signal, the operation of the upper armature of relay 37 connects the top contact of relay 30 to a lead 29 extending to the supervisory lamp L13 in the operator's position equipment OPE. Thus, at the end of this call, if the operator at the called station II should be the first to remove her cord circuit plug from the trunk line jack associated with this call, then the resultant absence of received tone-modulated carrier energy would effect the release of the armatures of relay 30. The release of the upper armature of relay 30 would now apply current from battery 26 over the operated upper armature of relay 37 and then along the lead 29 to effect the lighting of the supervisory lamp L13. This serves to provide the operator at the calling station XI with full supervision over both directions of transmission of this call.

If, at the time this call was initiated over channel C1, some other station on the other side of the called station II should be using this channel, the called station II might, if it were within transmitting-receiving range of this other station, already be receiving carrier waves of this frequency. In this event, the codan relay at the called station II would be previously energized and the resultant operation of its armatures would prevent its associated radio transmitter from sending back its answering identification tone with the result that the relays 30 and 37 at station XI would not become energized at this time.

Under this condition, when relay 35 at station XI operated its armatures at the expiration of its delay period, its inner armature would complete a circuit extending from battery 26, over the released upper armatures of relays 30 and 37, over the operated inner armature of relay 35, and then along a lead 72 to the busy lamp L3. The resultant illumination of the busy lamp L3 at this particular time serves as a reorder signal for indicating to the operator at station XI that the call to station II should now be attempted over another channel.

Since all of the stations are equipped in a substantially similar manner, the response of any one of them to an incoming call can be understood with reference to the following description of the operation of the station equipment shown in Figs. 7, 8 and 9 when station XI receives a call. For purposes of explanation, it will be assumed that this incoming call is transmitted over channel C21 and that the calling carrier is modulated with the second tone which is the identification tone assigned to station XI. It will be further assumed that, when the calling carrier is received by the radio receiver RR1, its quality will be satisfactory for communication purposes.

Accordingly, the codan control circuit 5 will effect the energization of the codan relay 4 thereby causing it to operate its armatures. The resultant operation of the upper armature of the codan relay 4 applies current from the battery 6 to the winding of relay 13 over the path described above. Relay 13 consequently operates its armatures to effect the lighting of the busy lamps L1 to L4, inclusive, and also the disablement of the outgoing jacks J1 to J4, inclusive, in the manner described above. This prevents the operator at station XI from now initiating a call over channel C1 which, as was stated above, is paired with the channel C21 used in this example by the calling station.

At this same time, the operation of the lower armature of the codan relay 4 connects an output of the radio receiver RR1 to the conductor 95 leading to the inputs of the tone detectors D1 to D5, inclusive. Since the calling carrier is modulated with the second tone, only the detector D2 in Fig. 9 will respond at this time and it will apply its output energy to the winding of the relay 50 to effect the operation of its armatures.

The operation of the bottom armature of relay 50 completes a circuit for energizing the tone relay TR. This energizing circuit extends from the battery 6 in Fig. 7, over the operated upper armature of the codan relay 4, along conductor 7, over the bottom released armatures in series of relays 11, 22, 33, and 44 to the junction point 60, along a lead 64 to a junction point 65, along a lead 61 to a junction point 68, along a lead 62, over the operated bottom armature of relay 50, over the released armature of a slow-to-operate relay 51 to a junction point 52, along a lead 53, and then through the winding of the tone relay TR to ground. Upon being thus energized, relay TR operates its armatures thereby performing a number of functions which will now be described.

The first of these functions is the starting of the radio transmitter RT1. This is accomplished when the inner lower armature of the tone relay TR moves into engagement with its associated contact thus applying current from a battery 54 to a junction point 55, over the released top armature of a relay 56 to a junction point 57, up along the lead 91 to a junction point 96 in Fig. 7, and then along the lead 92 to the winding of the start relay 1. The resulting energization of the start relay 1 effects the starting of the radio transmitter RT1 for sending back answering carrier waves over channel C1 which, as was stated above, is paired with the channel C21 used by the calling station.

The second function that is now performed is the modulation of the answering carrier with the identification tone assigned to this particular called station XI. This is automatically accomplished when the operation of the outer lower armature of the tone relay TR closes a circuit for applying audio frequency energy from the tone source T2 along a lead 63, over the outer lower armature of relay TR, up along the lead 93 to a junction point 97 in Fig. 7, along the lead 94, and then through the hybrid coil HC to the radio transmitter RT1.

Thus, the called station XI promptly responds to the call by automatically modulating carrier waves with its assigned identification tone and by automatically transmitting this tone-modulated answering carrier energy over the particular carrier frequency C1 which is paired with the frequency C21 of the calling carrier. This answering tone will, like the calling tone, be radiated continuously for the duration of the call.

The third function performed by the tone relay TR is the prevention at this time of the operation of the armatures of the slow-to-operate relay 51 which would otherwise occur at the expiration of its delay period due to the fact that the operation of the upper armature of the codan relay 4 has connected the battery 6 to a path extending along the lead 7, over the bottom released armatures in series of relays 11, 22, 33, and 44 to the junction point 60, along the lead 64 to the junction point 65, and then along the leads 61 and 66 to the top contact of relay TR which has its associated armature connected to the winding of relay 51. Accordingly, this function is accomplished by the operation of the top armature of relay TR which opens the portion of the above-described energizing circuit of relay 51 extending between the lead 66 and the winding of relay 51.

Referring back to the energization of the relay 50 by the tone detector D2, the operation of the bottom armature of relay 50 not only effects the energization of the tone relay TR in the manner described above, but also effects the lighting of the line lamp L5 in the portion of the operator's position equipment OPE that is shown in Fig. 9. This result is obtained due to the fact that, when the battery 6 in Fig. 7 is connected by the operation of the armatures of relays 4 and 50 to the above-described path extending along the leads 61 and 62 to the junction point 52, a portion of the current is applied over a lead 58 to a junction point 59, along a lead 14, and then over the released bottom armature of relay 15 to the line lamp L5. The resulting illumination of the line lamp L5 provides the operator with a visible indication that an incoming call has been received at station XI.

In response to the lighting of the line lamp L5, the operator at station XI answers the call by inserting into the incoming trunk line jack J5 a plug from any one of the cord circuits CC1 to CC5, inclusive, that is idle. This causes the cord circuit ground, such as the ground indicated at 90 in Fig. 7, to be applied over the sleeve of the inserted plug to the sleeve of the line jack J5 and then through the winding of relay 15 to a battery 16. Relay 15 will consequently now become energized and will operate its armatures to perform several functions which will now be described.

The first of these functions is to extinguish the line lamp L5. This is accomplished when the bottom armature of relay 15 is operated and thereby disconnects the energizing lead 14 from the line lamp L5. At this time, the bottom armature of relay 15 connects the line lamp L5 to a conductor 67 extending to the top contact of relay 50. This prepares a circuit for providing a supervisory signal as is described hereinafter.

The second of these functions is to terminate the exclusive control exercised from the calling station over the energization of the start relay 1 at the called station. Accordingly, the operation of the inner upper armature of relay 15 connects ground to one side of the winding of relay 56. Since the other side of the winding of relay 56 already has current from the battery 6 in Fig. 7 applied to it from the junction point 59 over the path described above, relay 56 now becomes energized and operates its armatures. The operation of the bottom armature of relay 56 closes a locking path to ground so that relay 56 will remain locked in an energized condition until either the relay 50 or the codan relay 4 is deenergized as is explained hereinafter. The operation of the top armature of relay 56 opens the above-described path between the junction points 55 and 57 so as to disconnect the battery 54 from the leads 91 and 92 extending to the winding of the start relay 1. This would tend to cause the start relay 1 to become deenergized except that such a result is prevented by the third function performed by the relay 15, as will now be explained.

This third function is to place the energization of the start relay 1 under the joint control of the operator at the calling station and the operator at the called station. To attain this objective, the operation of the outer upper armature of relay 15 connects a lead 17 to a lead 18 thereby closing another path between the junction points 55 and 57, this path being parallel to the path opened by the operation of the top armature of relay 56. The battery 54 will consequently be coupled to the lead 91 over this second parallel path. Due to the fact that relay 15 effects the connection of the leads 17 and 18 shortly before the relay 56 operates its armatures, the start relay 1 will be maintained in an energized condition without interruption at this time. The call can now proceed on a two-way basis with both the calling tone and the answering tone being transmitted continuously throughout the duration of the call.

At the end of the conversation period of a call, the disconnection of its two-way communication path can be initiated by the operator at either the calling station or the called station. In the latter instance, this is initiated when the operator at the called station XI withdraws her cord circuit plug from the incoming trunk line jack J5. This removes the cord circuit ground, such as the ground indicated at 90 in Fig. 7, from the energizing circuit of relay 15 which thereupon releases its armatures. The release of the outer upper armature of relay 15 opens the above-described path extending from battery 54 to the winding of the start relay 1. The resultant release of the armature of the start relay 1 opens the energizing circuit 2—3 of the radio transmitter RT1, thereby stopping its operation.

The release at this time of the inner upper armature of relay 15 opens the original energizing circuit of relay 56. However, since relay 56 is locked in an energized condition over its operated bottom armature, the release of the inner upper armature of relay 15 merely restores a portion of the circuit to its normal idle condition.

The release of the bottom armature of relay 15 causes the illumination of the line lamp L5 over the path previously described, thereby indicating to the operator at station XI that the disconnection has been effected at this station. Accordingly the equipment at this station is now restored to its normal idle condition except for relays 4, 13, and 50 and their associated circuits which remain in an energized condition until the operator at the calling station performs a disconnecting action.

Referring now to the calling station, it was explained above that, if the operator at the called station should be the first to disconnect, the codan relay at the calling station would no longer receive answering carrier energy and would consequently release its armatures. Accordingly, the tone detector which had been receiving the answering tone from the called station would be rendered inactive thereby causing its associated relay to release its armatures. This, in turn, would, as described above, effect the lighting of the supervisory lamp associated with the outgoing trunk link jack used for this call. Upon noticing the illumination of this supervisory lamp, the operator at the calling station would withdraw her cord circuit plug from the outgoing trunk line jack used for this call. This removes the cord circuit ground from the starting relay which consequently releases its armature to effect the stopping of its associated radio transmitter at the calling station.

Due to this termination of the transmission of tone-modulated carrier from the calling station, the radio receiver RR1 at the called station XI now becomes idle thereby causing its associated codan relay 4 to release its armatures. The release of the upper armature of the codan relay 4 disconnects the battery 6 from the above-described path extending over the lead 7 to the junction point 60 and along leads 64 and 8 to the winding of relay 13. Relay 13 consequently releases its armatures thereby extinguishing the busy lamps L1 to L4, inclusive, and reenabling the outgoing jacks J1 to J4, inclusive.

At the same time, the release of the bottom armature of the codan relay 4 opens the above-described path extending from an output of the radio receiver RR1 along lead 95 to the input of the tone detector D2 with the result that the associated relay 50 becomes deenergized and releases its armatures. The release of the bottom armature of relay 50 opens the above-described path extending over the lead 62 to the junction points 52 and 59. This causes the tone relay TR and the relay 56 to release their armatures thereby opening the lighting circuit of the line lamp L5. Accordingly, the line lamp L5 now becomes extinguished thus indicating to the operator at station XI that the two-way communication path has now been completely disconnected at both the calling and the called stations. This restores the circuits at both the calling and the called stations to their normal idle condition.

The above description is based on the assumption that the disconnection of the call was initiated by the operator at the called station. Let it now be assumed that the disconnection is initiated instead by the operator at the calling station. Accordingly, the first step would now be the removal by the operator at the calling station of her cord circuit plug from the outgoing trunk line jack used for this call. This causes a relay at the calling station, similar to the relay 33 described above, to release its armatures thereby opening the energizing circuit of its associated start relay and thus automatically effecting the stopping of the radio transmitter used at this station for this call. The deenergization of this relay also effects the opening of the energizing circuit of a relay corresponding to relay 35 which releases its armatures to effect the opening of the locking circuit of a relay corresponding to relay 37.

In addition, the release of the armatures of the relay corresponding to relay 33 disconnects a battery corresponding to battery 31 and from the lighting circuits of the busy lamps in the group associated with this channel at the calling station. However, since the codan relay is still energized, the release of the bottom armature of the relay corresponding to relay 33 will effect the energization of a relay corresponding to relay 13 over a path similar to that described above. The operation of the bottom armatures of this relay effects the illumination of all four of these busy lamps as an indication to the operator at the calling station that this stage of the disconnection has been completed.

Meanwhile, the codan relay at the called station will release its armatures due to the stopping of the radio transmitter at the calling station. The release of the upper armature of this codan relay opens the energizing circuit of relay 13 and causes it to release its armatures thereby extinguishing its associated busy lamps. The release of the bottom armature of the codan relay opens the path to the tone detector D2 thereby effecting the deenergization of relays TR, 50 and 56 in the manner explained above. Since relay 15 still remains energized, a path will now be closed for applying current from battery 76, over the released top armature of relay 50, along lead 67, and then over the bottom operated armature of relay 15 to the line lamp L5. The resultant illumination of the line lamp L5 at this time provides the operator at the called station with a visible indication of the stopping of the radio transmitter at the calling station.

Accordingly, the operator at the called station now withdraws her cord circuit plug from the incoming trunk line jack J5 thereby effecting the deenergization of relay 15. The resulting release of the outer top armature of relay 15 opens the energizing circuit of the start relay 1 which, in turn, releases its armature to open the energizing circuit 2—3 of the radio transmitter RT1 thereby stopping its operation. The release of the bottom armature of relay 15 effects the extinguishment of the line lamp L5 as an indication that the disconnection has been effected at this station.

Due to the termination of the transmission of carrier waves from the called station, the codan relay at the calling station will now release its armatures thereby opening the energizing circuit of the relay corresponding to relay 13. The resultant release of the bottom armatures of this relay opens the lighting circuits of the busy lamps in the group associated with this channel at the calling station. The extinguishment of these busy lamps at this time serves as an indication to the operator at the calling station that the two-way communication path has now been completely disconnected at both the calling and the called stations and that the circuits used for this call at both the calling and the called stations have now been restored to their normal idle condition.

When a call from a first station is to be routed through a second station to a more distant third station, the operator at the second station answers the call in the manner described above by inserting a plug from an idle one of her cord circuits into the appropriate incoming jack. After the operator at the first station has announced the identity of the desired third station, the operator at the second station takes the other plug extending from that particular one of her cord circuits which was used in answering the call from the first station and inserts it into an appropriate idle outgoing trunk line jack in one of her other tone and relay circuits.

For example, let it be assumed that, at a time when all the channels are idle, an operator at station X wishes to make a call through station XI to station II. Accordingly, the operator at station X would first initiate a call to station XI in the manner described above. Let it be further assumed that the operator at station XI answers this call by inserting the plug P4 from her cord circuit CC4, shown in Fig. 6, into the incoming trunk line jack 25 in the tone and relay circuit TRC5 thereby transmitting the second tone over channel C5. The operator at station X responds to this acknowledgment by sending over channel C25 radio telephone signals signifying that she desires the call to be routed to station II.

Upon being thus informed by the operator at station X that this call is to be routed to station II, the operator at station XI will take the other plug P14 from the cord circuit CC4 and will insert it into an appropriate idle outgoing trunk line jack in one of the other tone and relay circuits in her control equipment CE, such as the tone and relay circuit TRC1. In this example, the appropriate outgoing jack would be the jack J3 shown in Fig. 4 because this jack is connected to one of the sources T3 of the third tone which is the station identification tone that is assigned to station II.

The insertion of the plug P14 into the jack J3 causes the energization of the relay 33, shown in Fig. 8, which, as was described above, effects the starting of the radio transmitter RT1 and simultaneously effects the modulation of its carrier waves C1 with the third audio frequency tone from the source T3 which is coupled to the jack J3 into which the plug P14 is inserted.

When the operator at station II answers in the manner described above, the call proceeds with the signals transmitted from stations X and II being routed through the cord circuit CC4 at station XI. In other words, radio signals sent over channel C25 from station X are received by the radio receiver RR5 at station XI where they are demodulated to audio frequency signals which are transmitted through the cord circuit CC4 to the radio transmitter RT1 which, in turn, transmits them as radio signals over channel C1 to station II. Similarly, radio signals transmitted over channel C21 from station II are received by the radio receiver RR1 at station XI and the resulting demodulated signals are sent through the cord circuit CC4 to the radio transmitter RT5 which transmits corresponding radio signals over channel C5 to station X.

If it should be desired to communicate with a station located at a considerable distance, the call must be routed through several intermediate stations as was explained above. At each of these intermediate stations, the radio receiver which receives the call is connected in the manner described above by a pair of cord circuit plugs to a radio transmitter associated with a different tone and relay circuit at the same intermediate station. This process is repeated until the desired station is reached.

What is claimed is:

1. In a radiant energy signaling system having a specific section of the frequency spectrum allotted thereto for signaling purposes, said system comprising a network of signaling stations each having transmitting means adapted to transmit radiant energy carrier waves and receiving means adapted to receive radiant energy carrier waves, the method of establishing a point-to-point signaling path through said network from any one of said stations to any desired one of said stations, said method comprising dividing said allotted section of the frequency spectrum into a first half portion containing a first plurality of carrier frequencies and into a second half portion containing a second plurality of carrier frequencies, dividing said stations into a first group and a second group, at each station in said first group tuning the transmitting means to only carrier frequencies within said first portion of said allotted section of the frequency spectrum and the receiving means to only carrier frequencies within said second portion, at each station in said second group tuning the transmitting means to only carrier frequencies within said second portion and the receiving means to only carrier frequencies within said first portion, at any one of said stations such as at a first station in said first group of stations impressing only one of a plurality of assigned tones upon a selected one of said carrier frequencies within said first portion of said allotted section of the frequency spectrum, receiving said impressed tone at more than one station in said second group, responding to said received tone at only one station in said second group, at said responding station impressing one of said plurality of assigned tones upon a selected one of said carrier frequencies within said second portion, receiving said second-mentioned impressed tone at more than one station in said first group, responding to said received second-mentioned tone at only a second station in said first group by impressing at said station one of said plurality of tones upon a selected one of said carrier frequencies within said first portion, and repeating said above-mentioned steps until said desired station responds to one of said impressed tones.

2. In a radiant energy communication system having a specific section of the frequency spectrum alloted thereto for communication purposes, said system comprising a network of signaling stations each having transmitting means for transmitting radiant energy carrier waves and receiving means for receiving radiant energy carrier waves, the method of establishing a point-to-point communication path through said network from any one of said stations to any desired one of said stations, said method comprising dividing said allotted section of the frequency spectrum into a first half portion containing a first plurality of carrier frequencies and into a second half portion containing a second plurality of carrier frequencies, dividing said stations into a first group and a second group, at each station in said first group tuning the transmitting means to only carrier frequencies within said first portion of said allotted section of the frequency spectrum and the receiving means to only carrier frequencies within said second portion, at each station in said second group tuning the transmitting means to only carrier frequencies within said second portion and the receiving means to only carrier frequencies within said first portion, at any one of said stations such as at a first station in said first group of stations impressing only one of a plurality of assigned tones upon a selected one of said carrier frequencies within said first portion of said allotted section of the frequency spectrum, receiving said impressed tone at more than one station in said second group, responding to said received tone at only one station in said second group, at said responding station impressing one of said plurality of assigned tones upon a selected one of said carrier frequencies within said second portion, receiving said second-mentioned impressed tone at said first station and responding thereto by transmitting message signals to said responding station in said second group, at said responding station in said second group responding to said message signals by impressing a second one of said plurality of assigned tones upon a selected second one of said carrier frequencies within said second portion, receiving said third-mentioned impressed tone at more than one station in said first group, responding to said received third-mentioned tone at only a second station in said first group by impressing at said station one of said plurality of tones upon a selected one of said carrier frequencies within said first portion, and repeating said above-mentioned steps until said desired station responds to one of said impressed tones.

3. In a radiant energy communication system having a specific section of the frequency spectrum allotted thereto for communication purposes, said system comprising a network of signaling stations each having transmitting means for transmitting radiant energy carrier waves and receiving means for receiving radiant energy carrier waves, the method of establishing a point-to-point communication path through said network from any one of said stations to any desired one of said stations, said method comprising dividing said allotted section of the frequency spectrum into a first half portion containing a first plurality of carrier frequencies and into a second half portion containing a second plurality of carrier frequencies, pairing each of the carrier frequencies in said first portion with a corresponding carrier frequency in said second portion, dividing said stations into a first group and a second group, at each station in said first group tuning the transmitting means to only carrier frequencies within said first portion of said allotted section of the frequency spectrum and the receiving means to only carrier frequencies within said second portion, at each station in said second group tuning the transmitting means to only carrier frequencies within said second portion and the receiving means to only carrier frequencies within said first portion, at any one of said stations such as at a first station in said first group of stations impressing only one of a plurality of assigned tones upon a selected one of said carrier frequencies within said first portion of said allotted section of the frequency spectrum, receiving said impressed tone at more than one station in said second group, responding to said received tone at only one station in said second group, at said responding station impressing one of said plurality of assigned tones upon that particular one of the carrier frequencies within said second portion which is paired with said carrier frequency selected at said first station, receiving said second-mentioned impressed tone at said first station and responding thereto by transmitting message signals to said responding station in said second group, at said responding station in said second group responding to said message signals by impressing a second one of said plurality of assigned tones upon a selected second one of said carrier frequencies within said second portion, receiving said third-mentioned impressed tone at more than one station in said first group, responding to said received third-mentioned tone at only a second station in said first group by impressing at said station one of said plurality of tones upon that particular one of the carrier frequencies within said first portion which is paired with said second carrier frequency selected at said second station, and repeating said above-mentioned steps until said desired station responds to one of said impressed tones.

4. In a radiant energy communication system having a specific section of the frequency spectrum allotted thereto for communication purposes, said system comprising a network of signaling stations each having a plurality of radio transmitters adapted to transmit radiant energy carrier waves and a plurality of radio receivers adapted to receive radiant energy carrier waves, the method of establishing a point-to-point communication path through said network from any one of said stations to any desired one of said stations, said method comprising dividing said allotted section of the frequency spectrum into a first half portion containing a first plurality of carrier frequencies and into a second half portion containing a second plurality of carrier frequencies, pairing each of the carrier frequencies in said first portion with a corresponding carrier frequency in said second portion, dividing said stations into a first group and a second group, at each station in said first group tuning each of the radio transmitters thereat to a respectively different carrier frequency within said first portion of said allotted section of the frequency spectrum and tuning each of the radio receivers thereat to a respectively different carrier frequency within said second portion, at each station in said second group tuning each of the radio transmitters thereat to a respectively different carrier frequency within said second portion and tuning each of the radio receivers thereat to a respectively different carrier frequency within said first portion, at any one of said stations such as at a first station in said first group of stations starting any one of the radio transmitters thereat and modulating the carrier waves transmitted therefrom with only a selected first one of a plurality of assigned audio frequency tones, receiving said tone-modulated carrier waves transmitted within said first portion of said allotted section of the frequency spectrum at more than one station in said second group, responding to said received first tone at only one station in said second group by starting that one of its radio transmitters which is tuned to that one of the carrier frequencies within said second portion which is paired with the carrier frequency to which the above-mentioned transmitter at the first station is tuned, modulating the carrier waves transmitted from said responding transmitter with said first selected audio frequency tone, receiving said second tone-modulated carrier at said first station and responding thereto by transmitting message signals accompanied by said first tone to said responding station in said second group, at said responding station in said second group responding to said message signals by starting another one of the radio transmitters thereat and modulating the carrier waves transmitted therefrom over said second portion of the frequency spectrum with only a second selected one of said plurality of tones, receiving said third tone-modulated carrier at more than one station in said first group, responding to said received second tone at only a second station in said first group by starting that one of its radio transmitters which is tuned to that one of the carrier frequencies within said first portion which is paired with the carrier frequency to which said second-mentioned transmitter at said second station is tuned, modulating the carrier waves transmitted from said second responding transmitter with said second selected tone, and repeating the above-mentioned steps until said desired station responds to one of said transmitted tones.

5. In a radiant energy communication system in accordance with claim 4, the method of establishing a point-to-point communication path as set forth therein, said method including the additional steps of relaying message signals from said first station through said responding stations to said desired station, continuously accompanying said message signals with said selected tones for the duration of the communication, ultimately discontinuing the transmission of said selected tones, and terminating the establishment of said point-to-point communication path in response to the discontinuance of said tone transmission.

6. In a radio telephone signaling system having a plurality of radio channels and a plurality of signaling stations, each of said signaling stations having receiving means tuned to receive carrier waves transmitted over all of said radio channels, an automatic switching office comprising in combination a plurality of radio transmitters each tuned to transmit carrier waves over a respectively different one of said radio channels, each of said transmitters being normally in a non-operating condition, operator's position equipment including a plurality of groups of outgoing jacks having a plurality of jacks in each of said groups, said position equipment also including a plurality of operator's cord circuits each having a plug connected thereto, each of said plugs being adapted to be inserted into any one of said jacks, coupling means for coupling each group of outgoing jacks to a respectively different one of said transmitters, electroresponsive means responsive to the insertion of any one of said plugs into any jack in any of said groups of jacks for automatically effecting the starting of the particular radio transmitter coupled thereto, said automatic switching office having instumentalities for automatically routing calls over any one of said plurality of radio channels to any one of said signaling stations, said instrumentalities including a purality of groups of audio frequency tone generators having a plurality of generators in each group with each generator producing a station identification tone which is different from each of the tones produced by each of the other generators in its particular group of generators, all of the station identification tones produced by all of the generators in any one of said groups of generators being the same as all of the tones produced by all of the generators in each of the other groups of generators, each of said signaling stations having a respectively different one of said tones assigned thereto for station identification purposes, and means for automatically transmitting any one of said station identification tones over any one of said radio channels to that particular one of said signaling stations having that tone assigned thereto for station identification purposes, said last-mentioned means including connecting means for permanently connecting each of said tone generators to a respectively different one of said outgoing jacks.

7. A radio telephone signaling system having a specific section of the frequency spectrum allotted thereto for communication purposes, said allotted section of the frequency spectrum being divided into a first portion containing a first plurality of radio channels and into a second portion containing a second plurality of radio channels, said system comprising a network of radio telephone signaling stations divided into a first group of stations and a second group of stations, each of the stations in said first group having transmitting means tuned to transmit carrier waves over only said first plurality of radio channels and receiving means tuned for receiving carrier waves sent over only said second plurality of channels, each of the stations in said second group having transmitting means tuned to transmit carrier waves over only said second plurality of channels and receiving means tuned for receiving carrier waves sent over only said first plurality of channels, all of said receiving means being normally in an operating condition and all of said transmitting means being normally in a non-operating condition, each of the stations in both of said groups having a plurality of tone generators of different audio frequency tones which are the same at each of these staions, each of said tones being assigned for station identification purposes to more than one station in each of said groups, selective means at each of the stations in both of said groups for selecting any one of the tone generators thereat, first electroresponsive means at each of the stations in both of said groups for effecting the starting of said transmitting means thereat and for simultaneously effecting the modulation of its carrier waves with the tone from a selected generator, said first electroresponsive means at each of said stations being responsive to the selection of any one of said tone generators thereat by its respectively associated selective means, and second electroresponsive means at each of the stations in both of said groups for alternatively effecting the starting of the transmitting means thereat and for simultaneously effecting the modulation of its carrier waves sent over a radio channel in one of said pluralities of channels with its particular assigned station identification tone, said second electroresponsive means at each station being responsive to the reception by the receiving means thereat of its particular assigned station identification tone impressed upon carrier waves transmitted over one of the radio channels in the other of said pluralities of channels.

References Cited in the file of this patent

UNITED STATES PATENTS 2,670,435 Mitchell ---------------- Feb. 23, 1954